United States Patent

[11] 3,604,459

| [72] | Inventor | Nils O. Rosaen<br>3774 Quarton Rd., Bloomfield Hills, Mich. 48013 |
|---|---|---|
| [21] | Appl. No. | 13,500 |
| [22] | Filed | Feb. 24, 1970 |
| [45] | Patented | Sept. 14, 1971 |

[54] CARTRIDGE VALVE
11 Claims, 4 Drawing Figs.

[52] U.S. Cl. .................................................. 137/625.6
[51] Int. Cl. .................................................. F16k 11/02
[50] Field of Search .......................................... 251/43, 48;
137/596.14–596.18, 625.6, 625.61, 625.63, 625.66

[56] References Cited
UNITED STATES PATENTS

| 3,074,433 | 1/1963 | Stark | 137/625.26 X |
|---|---|---|---|
| 3,107,692 | 10/1963 | Forwald | 137/625.66 |
| 3,227,179 | 1/1966 | Rosaen | 137/625.6 X |
| 3,283,779 | 11/1966 | Rosaen | 137/596.14 |
| 3,349,801 | 10/1967 | Grundmann | 137/625.61 X |
| 3,411,535 | 11/1968 | Rosaen | 137/596.14 |

*Primary Examiner*—Henry T. Klinksiek
*Attorney*—Hauke, Gifford & Patalidis

ABSTRACT: A fluid valve having a sleeve portion and a pilot portion; the sleeve portion being actuated by the pilot portion to move between a first position in which fluid under pressure is detected to a fluid user and a second position in which fluid is exhaused from the fluid user through the fluid valve to a reservoir.

PATENTED SEP 14 1971
3,604,459
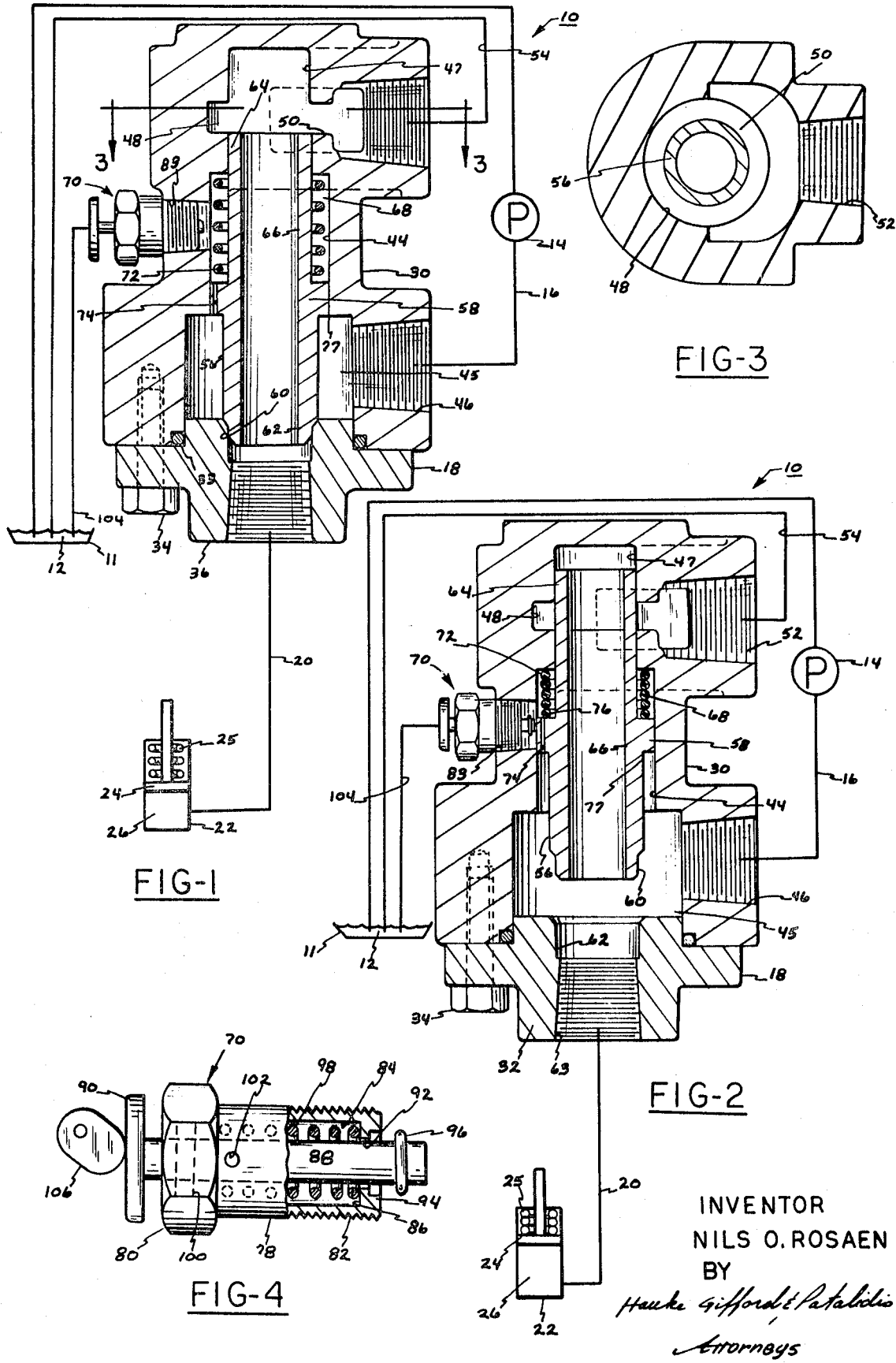
INVENTOR
NILS O. ROSAEN
BY
Hauke Gifford & Patalidis
Attorneys 3,604,459

CARTRIDGE VALVE

BACKGROUND OF THE INVENTION

1. Field of the Invention

The present invention relates to control valves and more particularly to a valve having a pilot valve portion and a sleeve portion operable upon actuation of a pilot valve to selectively direct fluid under pressure to a fluid user or to exhaust fluid from a fluid user.

2. Description of the Prior Art

Heretofore various fluid control valves, such as conventional pilot operated four-way valves, have been used to selectively direct pressure fluid to and to exhaust fluid from a fluid user. Such previously used valves are normally used to control the operational movement of a fluid motor, either of the rotary or linear type, in which the direction of rotation or the direction of the stroke is reversed by selectively directing the fluid to one of a plurality of inlet ports in a manner which is well known in the art of fluid control systems. Although such previously used valves enjoy a wide use and function in an acceptable manner, they are normally very expensive to manufacture. It would be desirable to provide a fluid control valve which will function in a manner which provides the same results as the previously used valves, but one which is substantially less expensive to manufacture.

SUMMARY OF THE INVENTION

The present invention which will be subsequently described in greater detail comprises an improved pilot valve operated in-line fluid valve responsive to system pressure to selectively direct fluid to and/or from a fluid user, and is substantially less expensive to manufacture than valves previously used for this purpose.

Other objects, advantages and applications of the present invention will become apparent to those skilled in the art to which the invention pertains when the accompanying description of an example of the best mode contemplated for practicing the invention is read in conjunction with the accompanying drawing.

BRIEF DESCRIPTION OF THE DRAWING

The description herein makes reference to the accompanying drawing wherein like reference numerals refer to like parts and in which:

FIG. 1 is a diagrammatic illustration of a fluid system including one example of a valve shown in longitudinal cross section incorporating the present invention;

FIG. 2 is a view similar to FIG. 1 illustrating the valve in an opened position;

FIG. 3 is a transverse sectional view taken on line 3—3 of FIG. 1; and

FIG. 4 is an enlarged partially sectioned view of the pilot valve illustrated in FIGS. 1 and 2.

DESCRIPTION OF THE PREFERRED EMBODIMENT

Referring to the drawing, and particularly FIGS. 1 and 2, for a detailed description of the present invention, one example of a fluid system 10 is illustrated as including a reservoir 11 for maintaining a supply of fluid 12. A pump 14 is normally operable to deliver fluid under pressure from its outlet via a conduit 16 to a normally closed valve, generally indicated at 18. When the valve 18 is in an opened position, as illustrated in FIG. 2, the fluid from the pump 14 is directed through the valve member 18 and a conduit 20 to a fluid user 22. The fluid user 22 is illustrated schematically as comprising a fluid actuated piston 24 operable in response to the fluid delivered to a chamber 26 behind the piston 24 to move the same in one direction to compress a spring 25. The spring 25 returns the piston 24 to its initial position when the pressure within the chamber 26 is reduced below a predetermined value.

It is to be understood that the piston 24 is intended only as an example of a fluid user and that the valve 18 is equally suitable for use with other types of fluid users, such as a fluid motor of the rotary type.

The valve 18 is of the cartridge type comprising a housing 30 and a cap 32 secured thereto by bolts 34. A seal 33 at the junction of the housing 30 and cap 32 prevents leakage externally of the housing 30. The housing 30 has a longitudinal bore 44, the lower end 45 of which is of an enlarged diameter and which is in fluid communication with an inlet port 46, which in turn is connected to the outlet of the pump 14 via the conduit 16. An upper reduced diameter end 47 of the bore 44 has an angular groove 48 forming a valve port 50, which communicates with an exhaust port 52 which, in turn, is connected to the reservoir 11 by a conduit 54.

A tubular valve member 56 has a piston section 58 slidably mounted within the bore 44. The lower end of the valve member 56 forms a poppet-type valve 60, which slidably engages a valve seat 62 formed on the inner end of an outlet port 63 within the cap 32. When the poppet valve 60 disengages the valve seat 62, the fluid within the enlarged lower end 45 of the bore 44 is in fluid communication with the fluid user 22. As can be seen in FIGS. 1 and 2, the lower end of the valve member 56 and the upper portion of the valve seat 62 are tapered to facilitate entry of the valve 60 into the bore forming the valve seat 62.

The upper end of the valve member 56 forms a spool-type valve 64 which slidably engages the upper reduced diameter end 47 to open and close fluid communication between the end 47 and the valve port 50. The interior of the tubular member 56 forms a passageway 66 which connects the exhaust port 52 to the outlet port 63 when the valve port 50 is opened, as will be explained in greater detail hereinafter.

The piston section 58 separates the enlarged lower end 45 from an annular control chamber 68, which in turn is selectively connected to the reservoir 11 by a pilot valve 70. Spring 72, wound around the tubular member 56 within the control chamber 68, exerts a force against the piston section 58 to urge the poppet-type valve 60 into engagement with the valve seat 62. The piston section has a restricted passageway 74, which connects the lower enlarged end 45 to the control chamber 68, thus when the pilot valve 70 is closed the pressure on opposite sides of the piston section 58 is equal. As can be seen in FIG. 1, the effective pressure-responsive area 76 of the piston section 58 exposed to the pressure within the control chamber 68 is greater than the effective pressure-responsive area 77 of the piston section 58 exposed to the pressure within the lower end 45, thus the resultant force unbalance acting on the piston section 58 aids the spring 72 to maintain the poppet valve 60 engaged with the valve seat 62. The diameters of the valve seat 62 and the upper end of the valve member 56 are substantially equal and since the opposite ends of the tubular valve member 56 are exposed to substantially equal pressures, the forces exerted on the opposite ends are equal and balanced. Thus the movement of the tubular valve member 56 is controlled by the pressure differential across the piston section 58.

Referring to FIG. 4 for a detailed description of the pilot valve 70 which is illustrated in an opened position, the valve 70 comprises a cylindrical housing 78 having a head portion 80 of a hexagonal configuration. The lower end of the housing 78 has an external threaded surface 82 to permit attachment of the pilot valve 70 to be threaded to a second exhaust port 83 of the valve 18, which in turn is in fluid communication with the control chamber 68. The housing 78 has an internal bore 84 which is partially closed at the bottom by a wall 86. A plunger 88 is reciprocably mounted within the bore 84 and extends outwardly from the head portion 80 at one end with an actuating button 90 formed thereon, while the opposite end extends through a central aperture 92 within the bottom wall 86 and outwardly therefrom.

The lower end of the housing 78 is recessed to provide a valve seat 94 which is adapted to be normally engaged by a radially enlarged portion 96 provided at the lower end of the plunger 88. The enlarged portion 96 is normally held against the valve seat in a fluid sealing engagement by a spring 98 disposed within the bore 84 around the plunger 88 and which is compressible between the bottom wall 86 of the housing 78 and a flange portion 100 on the upper portion of the plunger 88. The upper portion of the housing 78 has, at a point below the head portion 80, a transverse passage 102 which communicates with the internal bore 84 and which is adapted for connection to a conduit 104 which, in turn, is connected to the reservoir 11. The pilot valve 70 is shown in FIG. 4 with the plunger 88 depressed against the force of the spring 98 to open a fluid path from the control chamber 68 to the reservoir 11 so as to exhaust the control chamber 68. When the valve 70 is closed, the pressure of the fluid within the control chamber 68 is maintained at the same pressure as the fluid in the lower enlarged end 45 by the flow of fluid through the restricted passageway 74, as hereinbefore explained.

Although a rotating cam 106 is illustrated as controlling the plunger 88 to move the same upwardly and downwardly to respectively close and open the pilot valve 70, other actuating means can be used to accomplish the same results, such as an electrically operated solenoid or the like.

In operation of the valve 18, pressure fluid is directed from the pump 14 into the lower end 45 and to the control chamber 68 by means of the restricted passage 74. When the pilot valve 70 is closed so as to prevent fluid communication between the control chamber 68 and the reservoir 11, the pressure on opposite sides of the piston 58 are equal, as hereinbefore described. When the pilot valve 70 is closed, the force of the spring 72 and the resultant force created by the unbalanced areas of the piston section 58 maintain the poppet valve 60 of the tubular valve member 56 in a sealing engagement with the valve seat 62, thus preventing fluid communication between the pressure fluid generated by the pump 14 and the fluid user 22. When it is desired to direct fluid pressure to the fluid user 22, the pilot valve 70 is depressed by the cam 106, or any other suitable actuating device, to open the same, as illustrated in FIGS. 2 and 3. Upon opening of the pilot valve 70, the fluid within the control chamber 68 is exhausted through the aperture 92, the bore 84 and the transverse passage 102, the conduit 104 and to the fluid reservoir 11. Since the passageway 74 is a restricted passageway, the pressure differential on opposite sides of the piston section 58 will increase until the pressure within the lower enlarged end 45 exerts a force on the pressure-responsive area 77 sufficient to overcome the biasing force of the spring 72 and move the tubular valve member 56 upwardly to disengage the poppet type valve 60 from the valve seat 62. At the same time as the poppet-type valve 60 disengages the valve seat 62, the spool-type valve 64 at the opposite end of the tubular valve member closes off communication between the end 47 and the valve port 50, thus fluid is directed into the valve member 18 from the pump 14 through the outlet port 63 and to the fluid user 22 so as to actuate the piston member 24, as hereinbefore described. After the piston 24 has traversed the desired distance, the same may be returned to its initial position by closing the pilot valve 70. When the pilot valve 70 is closed, the pressure within the control chamber 68 rises until it equals the pressure within the lower end 45. As soon as the pressure differential across the piston section 58 reaches a predetermined value, the tubular valve member 58 will be shifted by the force of spring 72 such that the poppet-type valve 60 engages the valve seat 62 to prevent further fluid communication between the pump 14 and the fluid user 22. At the same time that the poppet-type valve 60 engages the valve seat 62, the spool-type valve 64 at the opposite end of the tubular member 56 opens fluid communication between the upper end 47 and the valve port 50. Spring 25 within the fluid user 22 exerts a force against piston 26 to shift the same towards its initial position forcing the fluid within the piston chamber 26 into the conduit 20 through the outlet port 63, the interior passageway 66, through the valve port 50, the exhaust port 52 and to the reservoir 11.

Although the fluid system 10 has been described as being operable as a liquid system, it is apparent that the system can be, with slight modification, utilized as a pneumatic system. Further, the pilot valve 70 can be actuated in timed relationship to the needs of the fluid user 22.

Although the fluid system 10 has been illustrated for alternately supplying fluid under pressure to and exhausting fluid from one side of the piston 24, it is apparent that the use of two such valve assemblies can be utilized to provide the means for supplying and exhausting fluid from opposite sides of the piston.

It can also be seen that pilot valve 70 need not be mounted to the housing of valve 18 but may be located at some distance therefrom. Further the restricted passageway 74 may be eliminated if a separate pilot pressure source is used.

Having thus described the invention, what is claimed is as follows:

1. A valve for supplying fluid to and exhausting fluid from a fluid user, said valve comprising:

a housing provided with an inlet port, an outlet port and an exhaust port, said housing having an axial bore and said inlet port, outlet port and exhaust port all registering with said bore;

a valve member axially movably mounted within said housing bore and being provided with means operable to close communication between said inlet port and outlet port, and to open communication between said outlet port and said exhaust port at a first axial position of said valve member and to open communication between said inlet port and said outlet port and to close communication between said outlet port and said exhaust port at a second axial position of said valve member; and means forming a pair of expansible pressure chambers, one of which is in fluid communication with said inlet port and a restricted passageway connecting said pressure chambers, said valve member being shiftable to said first axial position when said pressure chambers are at substantially equal pressures, and means for exhausting the other of said pressure chambers to create a pressure differential between said pressure chambers, said valve member being shifted to said second axial passage in response to said pressure differential.

2. The valve as defined in claim 1 in which said means for moving said valve member between said first and second axial positions comprises a piston portion carried by said valve member, the opposite walls of said piston portion being respectively exposed to said pair of expansible pressure chambers, the wall of said piston portion exposed to said other pressure chamber having an effective pressure-responsive area greater than the effective pressure-responsive area of the other of said opposite walls.

3. The valve as defined in claim 2 including spring means urging said valve member towards said first axial position.

4. The valve as defined in claim 3 wherein said restricted passageway extends through said piston portion to fluidly connect said pressure chambers.

5. The valve defined in claim 2, wherein one end of said valve member extending below said piston portion is of a reduced diameter for slidable extension within a second bore in the bottom of said housing, said second bore communicating with said outlet portion and said one pressure chamber when said valve member is in said second axial position; means in said valve member providing communication between said axial bore and said exhaust port comprising an axial passage in said valve member connecting said reduced lower end to the opposite end of said valve member, said housing bore having a radial passageway disposed proximate said opposite end of said valve member and connecting said exhaust port and said axial passage when said valve member is in said first position and closed by said valve member to close communication between said exhaust port and said axial passage when said valve member is in said second position.

6. The valve as defined in claim 5, including spring means urging said valve member toward said first axial position; and said restricted passage extending through said piston portion to fluidly connect said pressure chambers.

7. The valve as defined in claim 6, wherein said means for exhausting said other pressure chamber comprises a pilot valve adapted to selectively exhaust the fluid in said other pressure chamber through a fluid path of a larger cross section than said restricted passageway through said piston portion, such that the opening of said pilot valve to exhaust fluid from said one pressure chamber creates a pressure differential across said piston portion causing the pressure in said one pressure chamber to exceed the pressure in said other pressure chamber so that the resultant pressure unbalance exerts a force on said piston portion to move said piston portion and thus said valve member toward said second axial position.

8. A fluid pressure control valve assembly adapted for connection between a source of fluid and a fluid user, said assembly including a first and a second valve means, said first valve means comprising a housing having an inlet for communication with said source of fluid under pressure and an outlet port; a valve member axially slidably carried in said housing having means closing fluid flow from said inlet to said outlet port in a first axial position of said valve member and means opening fluid flow from said inlet to said outlet port in a second axial position of said valve member; means resiliently urging said valve member toward said first axial position; a first exhaust port and a second exhaust port provided in said housing each connected to a reservoir;

said second valve means being disposed between said second exhaust port and said reservoir to selectively control fluid flow through said second exhaust port;

first passage means provided in said housing of said first valve means;

second passage means associated with said valve member of said first valve means;

said first and said second passage means being adapted to establish communication between said inlet and said second exhaust port and being of different cross-sectional areas to cause the creation of a pressure differential within said housing acting on said valve member to move said valve member toward said second axial position and said second valve means being operable to selectively open or close fluid communication between said inlet and said second exhaust port through said first and said second passages to thereby create said pressure differential.

9. The fluid pressure control valve assembly as defined in claim 8, said valve member comprising a tubular stem member having an axial passage therethrough one end of which is open to said outlet port and the other end of which is closed to said second exhaust port, said tubular stem member having passage means adapted to establish communication between said inlet and said axial passage and thus to said outlet port when said valve member is in said first axial position, piston means carried by said valve member intermediate its ends thereof dividing said housing into a lower chamber and an upper chamber, said means disposed in said upper chamber and resiliently urging said valve member toward said first axial position.

10. A valve for supplying fluid to and exhausting fluid from a fluid user, said valve comprising;

a housing provided with an inlet port, an outlet port, and an exhaust port, said housing having an axial bore and said inlet port, outlet port, and exhaust port all registering with said bore;

a valve member axially movably mounted within said housing bore and being provided with means operable to close communication between said inlet port and said outlet port, and to open communication between said outlet port and said exhaust port at a first axial position of said valve member; and to open communication between said inlet port and said outlet port, and to close communication between said outlet port and said exhaust port at a second axial position of said valve member;

said means comprising: a spool, one end of which slidably engages the housing bore in a fluid sealing relationship to form a sleeve-type valve for opening and closing fluid communication between said exhaust port and said housing bore, the other end of said spool being adapted to engage and disengage said outlet port to form a poppet-type valve for opening and closing fluid communication between said outlet port and said inlet port, said spool having a bore extending axially therethrough from said one end to said other end; and means for moving said valve member from said first axial position to said second axial position.

11. The valve as defined in claim 10 wherein said spool has an effective pressure-responsive area at said one end of said spool which is substantially equal to the effective pressure-responsive area of said other end of said spool when said spool is in said first axial position.

UNITED STATES PATENT OFFICE
CERTIFICATE OF CORRECTION

Patent No. 3,604,459          Dated September 14, 1971

Inventor(s) Nils O. Rosaen

It is certified that error appears in the above-identified patent and that said Letters Patent are hereby corrected as shown below:

Abstract of the Disclosure, line 4, after "is" delete "detected" and insert --directed--.

Column 2, line 32, after "the" insert --upper end 47 to the outlet port 63 and thus connects--.

Column 3, line 40, after "FIGS." delete "2 and 3" and substitute the numeral --4--.

Signed and sealed this 4th day of April 1972.

(SEAL)
Attest:

EDWARD M. FLETCHER, JR.
Attesting Officer

ROBERT GOTTSCHALK
Commissioner of Patents